(12) United States Patent
Chung et al.

(10) Patent No.: US 8,264,270 B2
(45) Date of Patent: Sep. 11, 2012

(54) METHOD AND APPARATUS TO PROVIDE ACTIVE CANCELLATION OF THE EFFECTS OF THE PARASITIC ELEMENTS IN CAPACITORS

(75) Inventors: Shu Hung Henry Chung, Hong Kong (HK); Wai To Yan, Hong Kong (HK)

(73) Assignee: City University of Hong Kong, Kowloon (HK)

( * ) Notice: Subject to any disclaimer, the term of this patent is extended or adjusted under 35 U.S.C. 154(b) by 657 days.

(21) Appl. No.: 12/435,954

(22) Filed: May 5, 2009

(65) Prior Publication Data

US 2010/0283437 A1 Nov. 11, 2010

(51) Int. Cl.
*H03K 17/16* (2006.01)
*H03K 17/30* (2006.01)
(52) U.S. Cl. ....................................................... 327/382
(58) Field of Classification Search .................... 327/120
See application file for complete search history.

(56) References Cited

U.S. PATENT DOCUMENTS

| | | | |
|---|---|---|---|
| 1,920,948 A | 8/1933 | Crouse | 178/44 |
| 5,038,263 A | 8/1991 | Marrero et al. | 363/20 |
| 6,476,689 B1 | 11/2002 | Uchida et al. | 333/177 |
| 6,937,115 B2 | 8/2005 | Perreault et al. | 333/177 |
| 7,180,389 B2 | 2/2007 | Wang et al. | 333/181 |
| 7,242,269 B2 | 7/2007 | Perreault et al. | 333/177 |
| 2007/0188265 A1* | 8/2007 | Perreault et al. | 333/181 |
| 2008/0204126 A1 | 8/2008 | Wang et al. | 327/551 |

FOREIGN PATENT DOCUMENTS
WO  WO 2007/094921  8/2007

OTHER PUBLICATIONS

Erickson, R.W. And Maksimovic, D., "Fundamentals of Power Electronics," Norwell, Mass., Kluwer Academic, c2001.
Krein, P. T., "Nonlinear Phenomena in Power Electronics: Attractors, Bifurcation, Chaos, and Nonlinear Control," New York, IEEE Press, 2001, Chap. 8.
Mattingly, Doug, "Designing Stable Compensation Networks for Single Phase Voltage Mode Buck Regulators," Intersil Technical Brief TB 417.1, Dec. 2003.
Farkas, et al., "Viability of Active EMI Filters for Utility Applications," IEEE Transactions on Power Electronics, vol. 9, No. 3, May 1994, pp. 328-337.

(Continued)

*Primary Examiner* — Lincoln Donovan
*Assistant Examiner* — Daniel Rojas
(74) *Attorney, Agent, or Firm* — Heslin Rothenberg Farley & Mesiti P.C.

(57) ABSTRACT

Reducing, suppressing or canceling series parasitic inductance and/or resistive effects that affect the frequency response of components, elements and/or circuits in an electronic circuit or system that exhibit capacitance is disclosed. Noise generated by series parasitic inductance and/or parasitic resistance of the components, the physical orientation of the components, and/or the layout of components, devices and/or conductive tracks (board traces) on printed circuit boards within an electronic circuit or system is reduced, suppressed or canceled. The reduction, suppression or cancellation is achieved by adding a voltage source in series with a part or component of the electronic circuit or system that exhibits capacitance, the current source being adapted to deliver a compensating voltage of roughly equal magnitude and roughly opposite phase to parasitic voltage associated with the part or component.

19 Claims, 10 Drawing Sheets

OTHER PUBLICATIONS

Hamill, David C., "An Efficient Active Ripple Filter for Use in DC-DC Conversion," IEEE Transactions on Aerospace Electronic System, vol. 32, No. 3, Jul. 1996, pp. 1077-1084.

Lin, Y. H., Zheng, K. L., and Chen, K. H., "Smooth Pole Tracking Technique by Power MOSFET Array in Low-Dropout Regulators," IEEE Trans. Power Electron., vol. 23, No. 5, Sep. 2008, pp. 2421-2427.

Lu, B. and Ooi, B., "Nonlinear Control of Voltage-Source Converter Systems," IEEE Trans. Power Electron., vol. 22, No. 4, Jul. 2007, pp. 1186-1195.

Ogasawara, et al., "An Active Circuit for Cancellation of Common-Mode Voltage Generated by a PWM Inverter," IEEE Transactions on Power Electronics, vol. 13, No. 5, Sep. 1998, pp. 835-841.

Poon, et al., "Techniques for Input Ripple Current Cancellation: Classification and Implementation," IEEE Transactions on Power Electronics, vol. 15, No. 6, Nov. 2000, pp. 1144-1152.

Smedley, K. M. and Ćuk, S., "One-cycle control of switching converters," IEEE Trans. Power Electron., vol. 10, No. 6, Nov. 1995, pp. 625-633.

Vlatković, et al., "Input Filter Design for Power Factor Correction Circuits," IEEE Transactions on Power Electronics, vol. 11, No. 1, Jan. 1996, pp. 199-205.

Wang, et al., "Common-Mode Noise Reduction for Power Factor Correction Circuit With Parasitic Capacitance Cancellation," IEEE Transactions on Electromagnetic Compatibility, vol. 49, No. 3, Aug. 2007, pp. 537-542.

Wang, et al., "Design of Inductor Winding Capacitance Cancellation for EMI Suppression," IEEE Transactions on Power Electronics, vol. 21, No. 6, Nov. 2006, pp. 1825-1832.

Wang, et al., "Inductor Winding Capacitance Cancellation Using Mutual Capacitance Concept for Noise Reduction Application," IEEE Transactions on Electromagnetic Compatibility, vol. 48, No. 2, May 2006, pp. 311-318.

* cited by examiner

METHOD AND APPARATUS TO PROVIDE ACTIVE CANCELLATION OF THE EFFECTS OF THE PARASITIC ELEMENTS IN CAPACITORS

CROSS-REFERENCE TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

Patent application Ser. No. 12/435,941, by CHUNG et al., entitled "METHOD AND APPARATUS FOR SUPPRESSING NOISE CAUSED BY PARASITIC CAPACITANCE AND/OR RESISTANCE IN AN ELECTRONIC CIRCUIT OR SYSTEM"; and Patent application Ser. No. 12/435,979, by CHUNG et al., entitled "AN OUTPUT COMPENSATOR FOR A REGULATOR".

FIELD OF THE INVENTION

The present invention relates generally to components, elements and/or circuits for reducing or suppressing parasitic inductance and/or resistive effects that affect the frequency response of the components, elements and/or circuits in an electronic circuit or system. The invention relates particularly to methods and apparatus for reducing, suppressing or even cancelling noise generated by parasitic inductance and/or parasitic resistance of the components, the physical orientation of the components, and/or the layout of components, devices and/or conductive tracks (board traces) on printed circuit boards within an electronic circuit or system.

BACKGROUND OF THE INVENTION

The increasing sophistication of electronic circuits and systems presents unique challenges for circuit designers. The operating frequency of modern electrical and electronic equipment continues to increase, in order to reduce the physical size and weight of the electronic circuits and systems. However, the trend is hindered by the possible generation of undesirable effects, such as ringing and resonance, due to parasitic effects associated with the components, the physical orientation of the components, and/or the layout of components, devices and/or conductive tracks on printed circuit boards within an electronic circuit or system. These parasitic elements degrade the high-frequency performance of the entire electronic circuit or system.

There are many electronic circuit or system designs where parasitic inductance is a significant element that restricts circuit performance. Given an applied voltage, the parasitic inductance limits the rate at which the current can change. At high frequencies, parasitic inductance can have a major impact on chip performance and can cause chip failure if inductance is not properly detected and corrected. Self inductance is a property of a circuit whereby a change in current causes a change in voltage especially in circuit designs containing long paths or board traces. Mutual inductance comprises the full electromagnetic effect of one current loop over another especially in circuit designs containing long paths that are shielded.

A capacitor is one of the key components in the input and output filters of an electrical circuit. It is typically used as a shunt element to attenuate undesirable signals. However, its equivalent series inductance (ESL) and equivalent series resistance (ESR) significantly affect the capacitor's high frequency (HF) performance, causing non-ideal filter behavior.

FIG. 1 shows the schematic representation of a prior art high-frequency model for a capacitor 10. The capacitor 10 behaves like an inductor when the operating frequency is higher than the damped resonance frequency of the capacitor 10. The damped resonance frequency is determined by the capacitance of the capacitor, its ESL 12, and its ESR 14. FIG. 2 shows an impedance against operating frequency curve 20 for a 470 µF electrolytic capacitor, in which its ESL is 147 nH and its ESR is 67 mΩ. The damped resonance frequency $f_{dr}$ of the capacitor 10 coincides with the minimum value of impedance as illustrated in FIG. 2. The capacitor impedance is dominated by the ESL at high frequencies and its impedance increases with the operating frequency.

The ESL and ESR will introduce undesired voltage ripple at the output of the filter, conducted noise at the input of the filter, and resonance with the other components and parasitic element in the circuit. FIG. 3 shows a buck converter 30 with prior art capacitors 10 as the input and output capacitors. The supply source 32 of the converter 30 is $v_{in}$. The duty time of the switching element S 34 is adjusted to control the output voltage 36 across the load. FIG. 4 depicts the effects of ESL and ESR on the output voltage of the buck converter 30 when there is a sudden load change. The initial voltage spike 40 is firstly caused by ESL. Then, the effect of the ESR that causes a voltage step 41 that follows. After the transient period settles, the capacitor 10 will discharge to the load 36. Thus, it is crucial to cancel the effects caused by the ESL and ESR.

One prior-art approach for overcoming the parasitic effects is to connect several capacitors of different types in parallel so that different frequency ranges can be covered. However, this only partially resolves the problem at the expense of increasing the physical size, complexity and cost of the electronic circuit or system. Moreover, the added capacitors might resonate with the stray inductance within the circuit and the ESL of other added capacitors.

There are two main approaches to canceling the effects of parasitic inductance on a circuit or system. The first is based on canceling the parasitic inductance of a particular component while the second is based on canceling the effect caused by all parasitic inductances in the entire circuit or system.

As shown in FIG. 5, some coupled magnetic windings 11a, 11b are used to nullify the effect of the parasitic inductance of the capacitor 10. The coupled windings 11a, 11b will give an equivalent negative inductance in series with the capacitor. Although the ESL can be canceled, the structure will produce an additional inductance in series with the load 36. Moreover, it cannot cancel the ESR effect. This will affect the dynamic behavior of the output voltage across the load 36. Such structure is more suitable for input filter design. Nevertheless, the coupling effect is highly dependent on the magnetic properties of the core materials of the coupled windings.

A prior-art method using the second approach is based on adding passive circuits. The parasitic effects are canceled at the circuit level. By extending the first approach, a coupled winding that can cancel parasitic inductance of capacitors in an electromagnetic interference (EMI) filter has been proposed. In other approaches, some active noise cancellation circuits that can cancel the undesired effects caused by the parasitic elements have been proposed.

OBJECTS OF THE INVENTION

An object of the invention is to mitigate and/or obviate to some degree one or more problems associated with known methods of reducing parasitic inductance and/or parasitic resistance of electronic circuits, systems or components of such circuits or systems.

Another object of the invention is to provide means for reducing parasitic inductance of a capacitive part or element of an electronic circuit or system.

Yet another object of the invention is to improve the frequency response characteristics of circuits, systems or components of such circuits or systems.

One skilled in the art will derive from the following description other objects of the invention. Therefore, the foregoing statements of object are not exhaustive and serve merely to illustrate some of the many objects of the present invention. Furthermore, one skilled in the art will understand that the embodiments of the present invention as hereinafter described may address one, some or all of said objects, but may do so only to a limited degree. The statements of objects are defined merely by way of example and are not to be regarded as being requiring to be satisfied by each and every embodiment.

SUMMARY OF INVENTION

According to the present invention there is provided method and apparatus for suppressing or at least reducing the effect of the series parasitic inductance and resistance of an electrical component, particularly a capacitive network, or circuit, on the frequency response of the component and circuit.

In one general aspect of the invention, an apparatus is coupled in series with a capacitor associated series inductance and resistance. It comprises of an active voltage source that generates a voltage counteracting the voltages across the parasitic inductance and resistance, so that the effect caused by the inductance and resistance can be suppressed, reduced or canceled. The magnitude of the active voltage source is derived by sensing the capacitor current. The frequency response of the capacitor will be enhanced with the inductance and resistance suppressed.

In another general aspect of the invention, some other forms of non-isolated and isolated structures can be derived. The capacitor current can be sensed and the output voltage can be generated by non-isolated and isolated means.

In accordance with a main aspect of the invention, there is provided a method of reducing a parasitic effect in an electronic circuit or system. The method comprises identifying a part of the electronic circuit or system that exhibits capacitance, determining a value of a series parasitic effect associated with the part of the electronic circuit or system that exhibits capacitance, sensing a voltage signal across the part of the electronic circuit or system, determining from the sensed voltage signal and the value of the series parasitic effect, a parasitic voltage associated with the part of the electronic circuit or system, and adding a voltage source in series with the part of the electronic circuit or system, the voltage source being adapted to deliver a compensating voltage of generally equal magnitude but generally in opposite phase to the determined parasitic voltage.

Preferably, the added voltage source comprises an active voltage source.

The added voltage source may be implemented using any of a passive circuit; a linear-type voltage source; or a switched-mode voltage source.

Where the series parasitic effect comprises a series inductive effect, the steps of determining from said sensed voltage signal and said value of the series parasitic effect a parasitic voltage associated with said part of the electronic circuit or system and adding a voltage source in series with said part of the electronic circuit or system may comprise using a differentiator circuit to differentiate the sensed voltage signal and using a voltage driver circuit to generate the compensating voltage.

Where the series parasitic effect comprises a series resistive effect, the steps of determining from said sensed voltage signal and said value of the series parasitic effect a parasitic voltage associated with said part of the electronic circuit or system and adding a voltage source in series with said part of the electronic circuit or system may comprise using a multiplier circuit to determine the compensating voltage from the sensed voltage signal and using a voltage driver circuit to generate the compensating voltage.

Where the series parasitic effect comprises both a series inductive effect and a series resistive effect, the steps of determining from said sensed voltage signal and said value of the series parasitic effect a parasitic voltage associated with said part of the electronic circuit or system and adding a voltage source in series with said part of the electronic circuit or system may comprise using a differentiator circuit to differentiate the sensed voltage signal to determine a first compensating voltage for the series inductive effect, using a multiplier circuit to determine a second compensating voltage from the sensed voltage signal for the series resistive effect and using a single voltage driver circuit to generate a combined compensating voltage comprising said first and second compensating voltages.

The part of the electronic circuit or system may comprise any of an electronic system, a printed circuit board 'PCB', or a component or element on said PCB such as an inductor, a diode, a transistor, or wires or board traces.

In accordance with another main aspect of the invention, there is provided an electronic circuit or system. The electronic circuit or system comprises means for determining a value of a series parasitic effect associated with a part of the electronic circuit or system that exhibits capacitance, means for sensing a voltage signal across the part of the electronic circuit or system, means for determining from the sensed voltage signal and the value of the series parasitic effect, a parasitic voltage associated with the part of the electronic circuit or system, and a voltage source in series with the part of the electronic circuit or system, the voltage source being adapted to deliver a compensating voltage of generally equal magnitude but generally in opposite phase to the determined parasitic voltage.

Preferably, the added voltage source comprises an active voltage source.

The added voltage source may comprise any of: a passive circuit; a linear-type voltage source; or a switched-mode voltage source.

Where the series parasitic effect comprises a series inductive effect, the electronic circuit or system may comprise a differentiator circuit to differentiate the sensed voltage signal and a voltage driver circuit to generate the compensating voltage.

Where the series parasitic effect comprises a series resistive effect, the electronic circuit or system may comprise a multiplier circuit to determine the compensating voltage from the sensed voltage signal and a voltage driver circuit to generate the compensating voltage.

Where the series parasitic effect comprises both a series inductive effect and a series resistive effect, the electronic circuit or system may comprise a differentiator circuit to differentiate the sensed voltage signal to determine a first compensating voltage for the series inductive effect, a multiplier circuit to determine a second compensating voltage from the sensed voltage signal for the series resistive effect and a single voltage driver circuit to generate a combined compensating voltage comprising said first and second compensating voltages.

The part of the electronic circuit or system may comprise any of an electronic system, a printed circuit board 'PCB', or a component or element on said PCB such as an inductor, a diode, a transistor, or wires or board traces.

In accordance with another main aspect of the invention, there is provided a method of reducing a parasitic effect in an electronic circuit. The method comprises determining a value of a parallel parasitic effect associated with a capacitor in the electronic circuit, sensing a voltage signal across the capacitor, determining from the sensed voltage signal and the value of the parallel parasitic effect a parasitic voltage associated with the capacitor, and adding a voltage source in series with the capacitor, the voltage source being adapted to deliver a compensating voltage of generally equal magnitude but generally opposite phase to the determined parasitic voltage.

In accordance with another main aspect of the invention, there is provided an electronic circuit. The electronic circuit comprises a capacitor, means for sensing a voltage signal across the capacitor, means for determining from the sensed voltage signal and a value of a series parasitic effect associated with the capacitor a parasitic voltage associated with the capacitor, and a voltage source in series with the capacitor, the voltage source being adapted to deliver a compensating voltage of generally equal magnitude but generally opposite phase to the determined parasitic voltage.

BRIEF DESCRIPTION OF THE DRAWINGS

The foregoing and further features of the present invention will be apparent from the following description of preferred embodiments which are provided by way of example only in connection with the accompanying figures, of which.

DETAILED DESCRIPTION OF PREFERRED EMBODIMENTS

Figure 1:
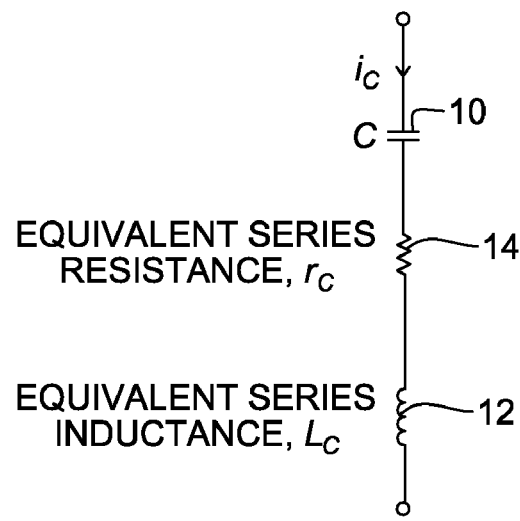
FIG. 1 is a schematic representation of a prior art high-frequency model for a capacitor.
Figure 2:
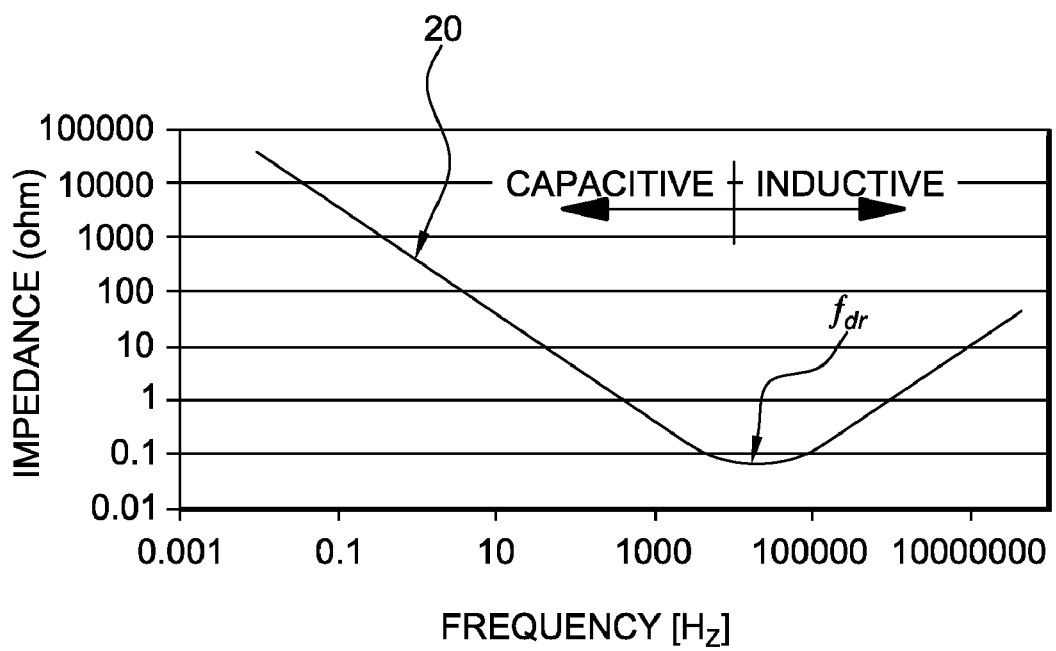
FIG. 2 is a graphical depiction of the magnitude of the impedance against operating frequency of the prior art capacitor of FIG. 1.
Figure 3:
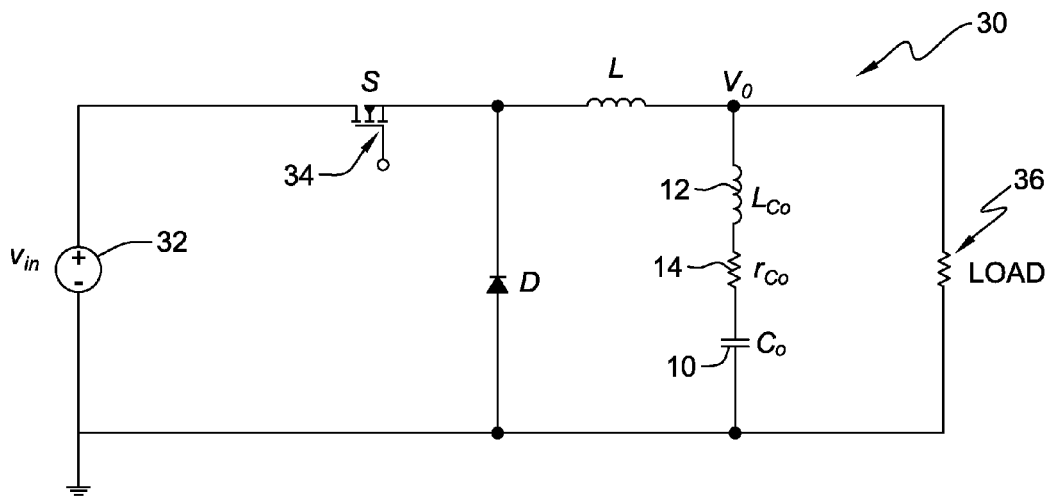
FIG. 3 is a circuit diagram showing a buck converter with prior art capacitors as the input and output capacitors.
Figure 4:
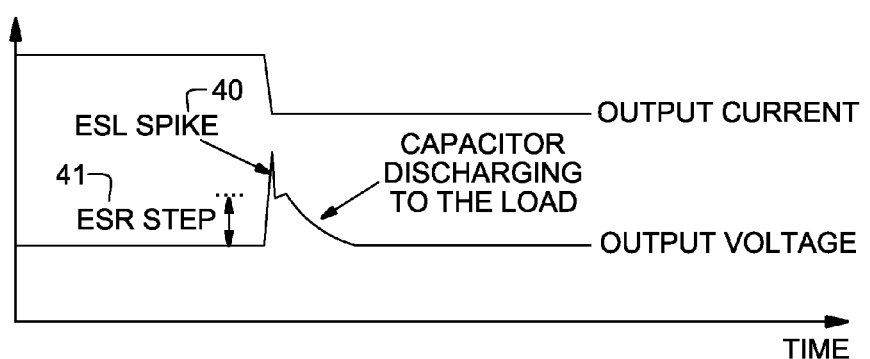
FIG. 4 is a graphical depiction of the effects of the parasitic elements on the output voltage of the buck converter when the load is suddenly reduced.

The present invention provides a method and system for reducing a parasitic effect in an electronic circuit or system. The method comprises: identifying a part of the electronic circuit or system that exhibits capacitance. This can be achieved through testing the circuit or system using known techniques. Alternatively, identification may merely comprise a recognition that a particular component such as a capacitor is designed to exhibit capacitance and that said level of capacitance is a designed feature of said component. A skilled person will be familiar with the many methods of identifying parts of a circuit or system or components of a circuit or system that exhibit some degree of capacitance. The method also comprises determining a value of a series parasitic effect associated with said part of the electronic circuit or system that exhibits capacitance. There are a wide range of methods for measuring parasitic inductance and again one skilled in the art will be familiar with how such measure is determined or measured. For example, from Joseph J. Carr, "Secrets of RF Circuit Design," page 315, 2000, incorporated herein by reference, it is known to connect a tracking generator and a spectrum analyzer across a component or part of a circuit exhibiting capacitance as a means of determining its series or parasitic inductance. Alternatively, parasitic inductance can be measured using a conventional inductance-capacitance-resistance (LCR) meter which typically has high resolution and is easy to use Alternatively, ECE331 "Electromagnetics Laboratory—Parasitic Inductance," incorporated herein by reference, there is disclosed a method of determining or measuring parasitic inductance where the level of parasitic inductance is too small for measurement by a typical RLC meter. Another alternative is Time-domain reflectometry (TDR) which is commonly used as a convenient method of determining the characteristic impedance of a transmission line or quantifying reflections caused by discontinuities along or at the termination of a transmission line. TDR can also be used to measure quantities such as the input capacitance of a voltage probe, the inductance of a Jumper wire, the end-to-end capacitance of a resistor, or the effective loading of a printed circuit board. Element values can be calculated directly from the integral of the reflected or transmitted waveform and these values can be used to measure parasitic inductance. The method further comprises sensing a voltage signal across said part of the electronic circuit or system and this can be achieved using a voltage sensor of known type. The method also comprises determining from said sensed voltage signal and said value of the series parasitic effect a parasitic voltage associated with said part of the electronic circuit or system; and adding a voltage source in series with said part of the electronic circuit or system; wherein said voltage source is arranged to deliver a compensating voltage of generally equal magnitude but generally opposite phase to said determined parasitic voltage.

The part of the electronic circuit or system identified as exhibiting capacitance may comprise any of: an electronic system itself, a printed circuit board 'PCB', or a component or element on said PCB such as an inductor, a diode, a transistor, or wires or board traces.

Figure 6:
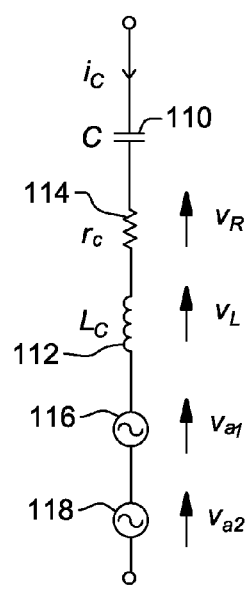
FIG. 6 is a circuit diagram showing how the parasitic components can be canceled with added voltage sources.

The present invention uses an active voltage source that generates a compensating signal counteracting the voltage signal across the parasitic inductance and resistance of a part or component of an electronic circuit or system that exhibits capacitance. As shown in FIG. 6, the parasitic voltages across capacitor 110 associated with its ESL $L_C$ 112 and ESR $r_C$ 114 are $v_L$ and $v_R$, respectively. The magnitudes of $v_L$ and $v_R$ are equal to $$v_L = L_C \frac{di_C}{dt} \qquad (1)$$

$$v_R = r_C i_C \qquad (2)$$

In an electronic circuit or system, the effects of $L_C$ 112 and $r_C$ 114 can be canceled by using two auxiliary voltage sources $v_{a1}$ 116 and $v_{a2}$ 118 connected in series with the capacitor 100. $v_{a1}$ and $v_L$ are equal in magnitude and phase opposition. Thus, $$v_{a1} = -v_L = -L_C \frac{di_C}{dt} \qquad (3)$$

Similarly, $v_{a2}$ and $v_R$ are equal in magnitude and phase opposition. Thus, $$v_{a2} = -v_R = -r_C i_C \qquad (4)$$

The two voltage sources 116, 118 can be implemented by passive circuits, linear-type or switched-mode voltage sources, provided that the requirements given in equations (3) and (4) are satisfied.

Figure 7:
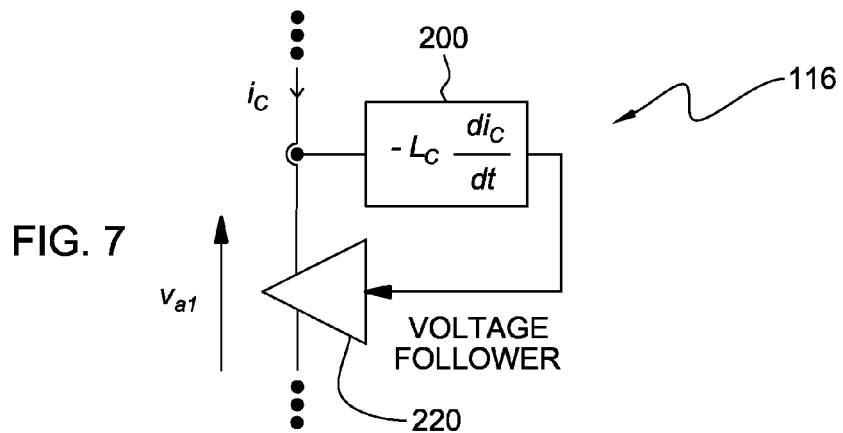
FIG. 7 is a circuit diagram showing a preferred embodiment for generating a compensating voltage for series parasitic inductance.

A preferred embodiment for $v_{a1}$ 116 is shown in FIG. 7. It comprises two parts. The first part is a differentiator circuit 200 for differentiating the sensed capacitor current $i_C$ to realize equation (3). The second part is a voltage follower 220 that generates voltage $v_{a1}$ following the output of the differentiator 200. The preferred embodiment for $v_{a1}$ 116 may include a voltage sensor for sensing the voltage signal across the capacitor 110 or across any part or component of an electronic circuit or system which exhibits capacitance and has associated therewith parasitic inductance that would usefully be compensated to enhance the frequency response of the electronic circuit or system.

It will be understood that implementing a voltage source as proposed using the embodiment of FIG. 7 will, to some degree, compensate for the parasitic inductance of a capacitive component or part of a circuit or system and may by itself be sufficient to improve the frequency response of the circuit or system without adding any means for compensating for any series parasitic resistance effect caused by said component or part of the electronic circuit or system.

Figure 8:
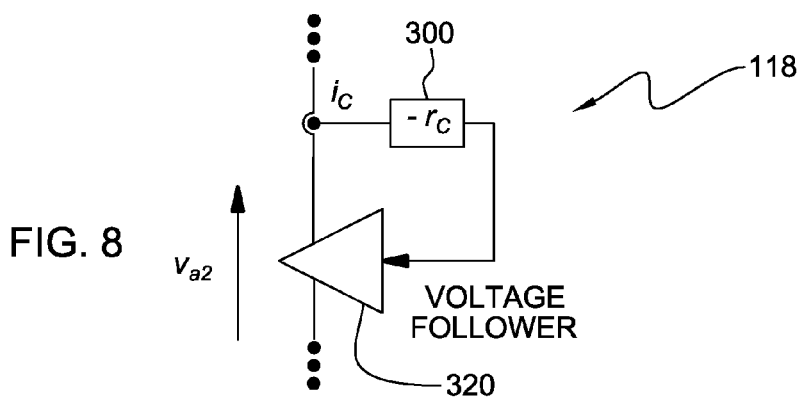
FIG. 8 is a circuit diagram showing a preferred embodiment for generating a compensating voltage for series parasitic resistance.

A preferred embodiment for $v_{a2}$ 118 is shown in FIG. 8. It also comprises two parts. The first part is a multiplier circuit 300 for multiplying $r_C$ and $i_C$ to realize equation (4). The second part is a voltage follower 320 that generates voltage $v_{a2}$ following the output of the multiplier circuit 300. The preferred embodiment for $v_{a2}$ 118 may include a voltage sensor for sensing the voltage signal across the capacitor 110 or across any part or component of an electronic circuit or system which exhibits capacitance and has associated therewith parasitic inductance that would usefully be compensated to enhance the frequency response of the electronic circuit or system.

It will be understood that implementing a voltage source as proposed using the embodiment of FIG. 8 will, to some degree, compensate for the series resistance of a capacitive component or part of a circuit or system and may by itself be sufficient to improve the frequency response of the circuit or system without adding any means for compensating for any series parasitic inductive effect caused by said component or part of the electronic circuit or system.

Figure 9:
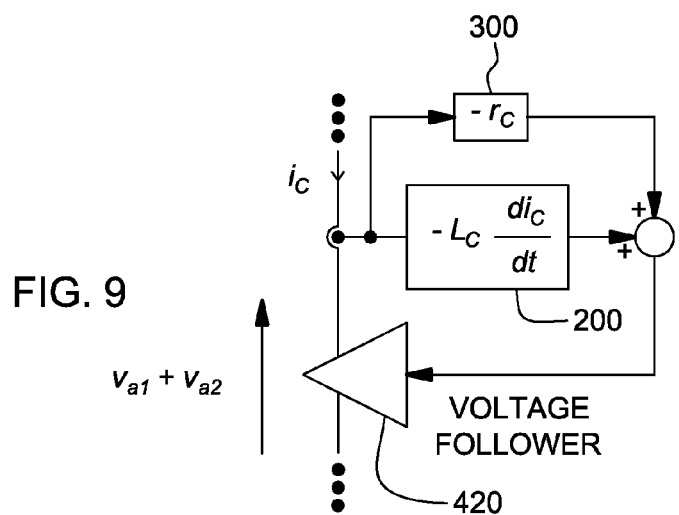
FIG. 9 is a circuit diagram showing a preferred embodiment for generating a combined compensating voltage for series parasitic inductance and resistance.

The two voltage sources can, however, be implemented together to compensate for both series parasitic inductance and resistance of a component or part of a circuit or system exhibiting capacitance. In this embodiment, only a single voltage follower 420, as shown in FIG. 9, is provided. The input of the voltage follower 420 is the sum of the differentiator circuit 200 and the multiplier circuit 300.

The magnitude of $v_{a1}+v_{a2}$ is in the order of a few tenth mV. Thus, the required power rating of the voltage follower 420 is low, even if the capacitor current is large.

It will be appreciated that the embodiments of any of FIGS. 7 to 9 can be implemented in integrated circuit 'IC' form or by any other suitable electronic components known to one skilled in the art.

The two voltages sources 116, 118 of FIGS. 7 and 8, respectively, or the combined voltage source of FIG. 9 may comprise an active voltage source. The two voltage sources 116, 118 of FIGS. 7 and 8, respectively, or the combined voltage source may be implemented using any of a passive circuit; a linear-type voltage source; or a switched-mode voltage source.

Figure 10:
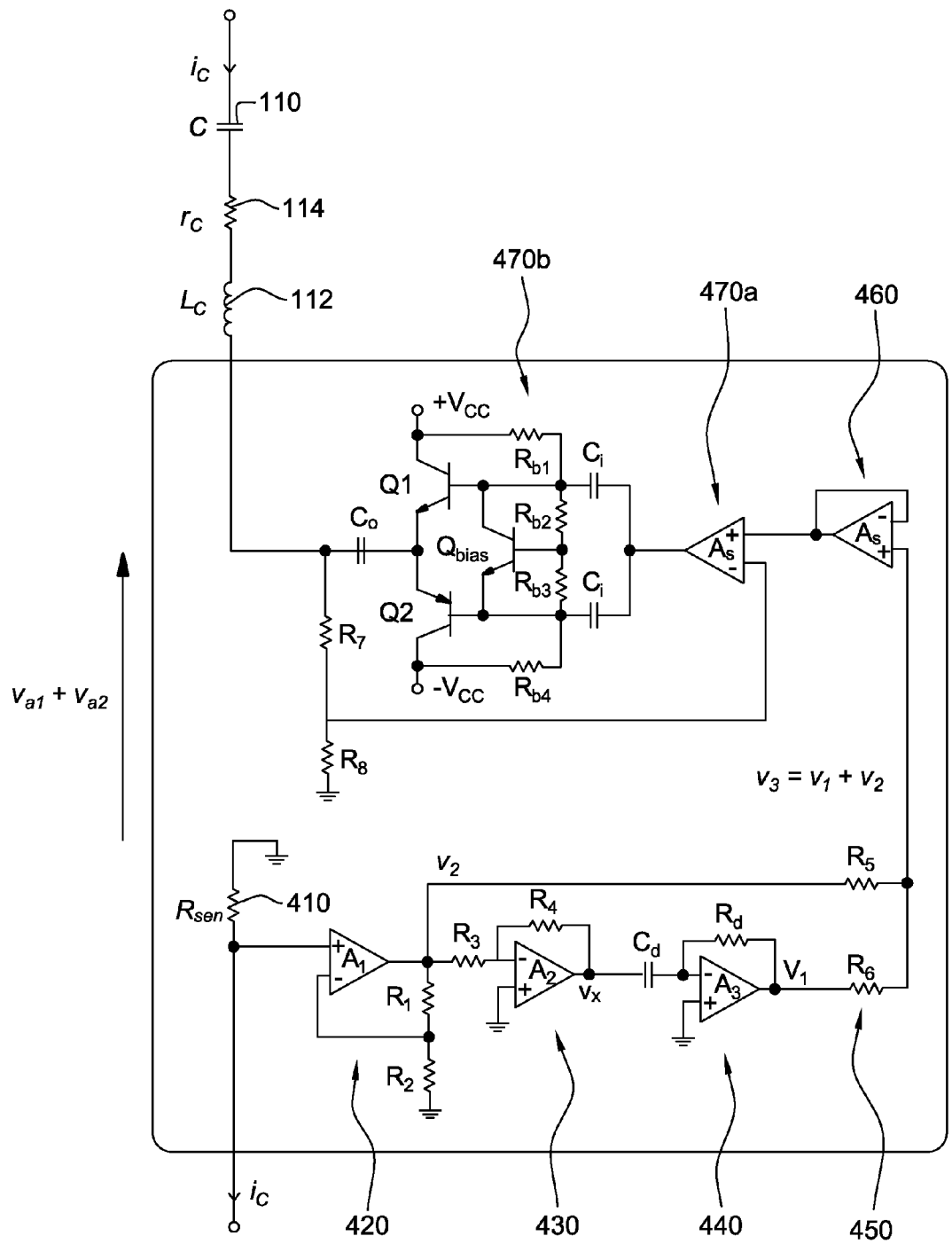
FIG. 10 is a circuit diagram showing a practical implementation of the preferred embodiment.

A practical implementation of the embodiment of a combined voltage source of FIG. 9 is shown in FIG. 10. In operation, the current of the capacitor 110 is sensed by a sensing resistor $R_{sense}$ 410, which can be a non-inductive sensing resistor, a resistor fabricated on a printed circuit board, a hall-effect current transducer, for example. Its voltage will be amplified by a non-inverting amplifier 420 formed by the operational amplifier $A_1$, $R_1$, and $R_2$. The values of $R_1$ and $R_2$ are designed to make the amplifier output $v_2$ equal to $$v_2 = -i_C(r_C + R_{sense}) \qquad (5)$$

$v_2$ is further amplified by an inverting amplifier 430 formed by the operational amplifier $A_2$, $R_3$, and $R_4$. The amplifier output $v_x$ will be differentiated by a differentiator circuit 440 formed by $A_3$, $R_d$, and $C_d$. The values of $R_3$, $R_4$, $R_d$, and $C_d$ will be designed to make the differentiator output $v_1$ equal to $$v_1 = -L_C \frac{di_C}{dt} \qquad (6)$$

The voltages $v_1$ and $v_2$ are added together by a resistive network 450 comprising two resistors, $R_5$ and $R_6$, which are theoretically equal in value, to give the voltage $v_3$. Based on equations (3)-(6), $$v_3 = v_1 + v_2 = v_{a1} + v_{a2} \qquad (7)$$

The magnitude of $v_3$ is thus the required output voltage of the proposed apparatus. It is then used to drive a class AB amplifier through a buffer 460 formed by $A_4$. The class AB amplifier 470 consists of two stages. The first stage 470a is a non-inverting amplifier formed by $A_5$, $R_7$ and $R_8$. The second stage 470b is the power stage formed by the coupling capacitor $C_i$, $R_{b1}$, $R_{b2}$, $R_{b3}$, $R_{b4}$, $Q_{bias}$, $Q_1$ and $Q_2$. $R_{b1}$, $R_{b2}$, $R_{b3}$, $R_{b4}$, and $Q_{bias}$ form the biasing network for the two output transistors $Q_1$ and $Q_2$. The ac component of the output of the class AB amplifier is coupled to the output of the apparatus through the capacitor $C_o$. The non-inverting amplifier and the power stage form a feedback system such that the output of the apparatus has to be the same as $v_3$. Thus, the value of the output of the apparatus will be equal to $$v_3 = v_{a1} + v_{a2} \tag{8}$$

Figure 11:
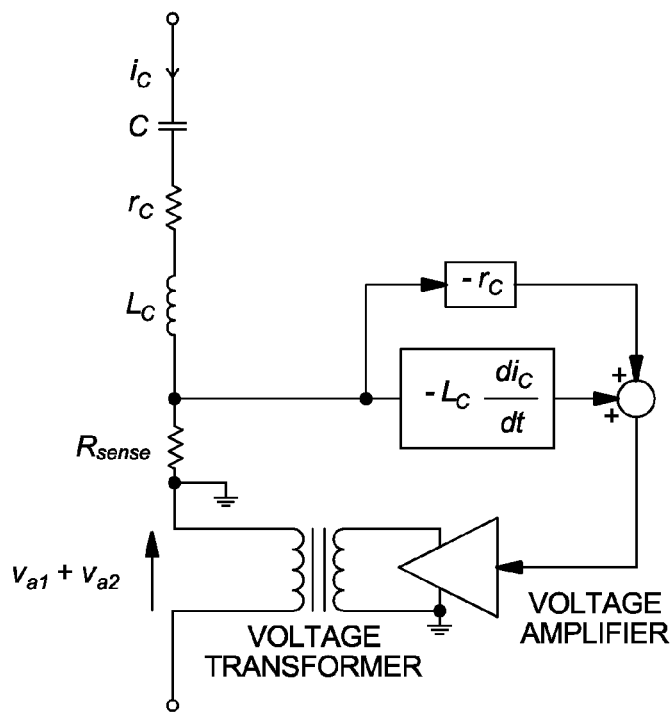
FIG. 11 is a circuit diagram showing the embodiment of FIG. 9 with an isolated input using a voltage transformer.
Figure 12:
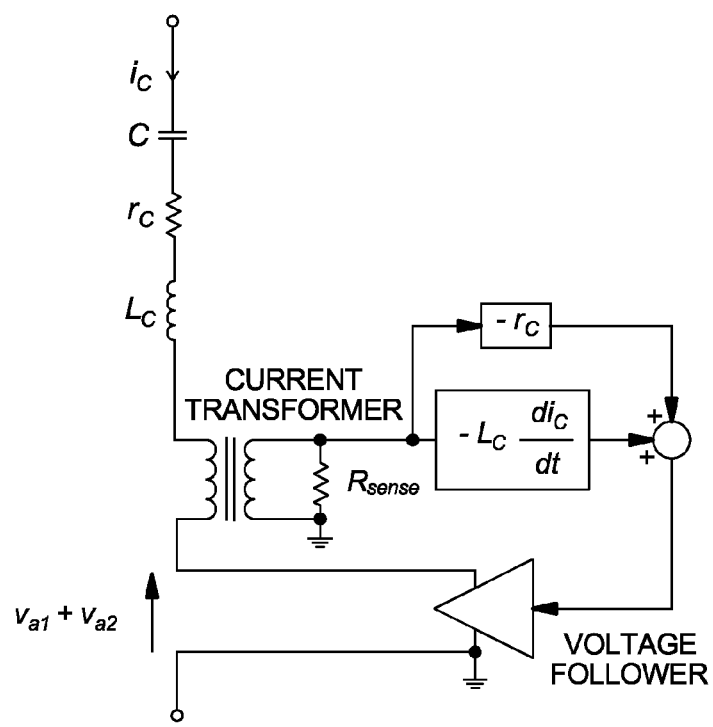
FIG. 12 is a circuit diagram showing the embodiment of FIG. 9 with an isolated sensing input using a current transformer.
Figure 13:
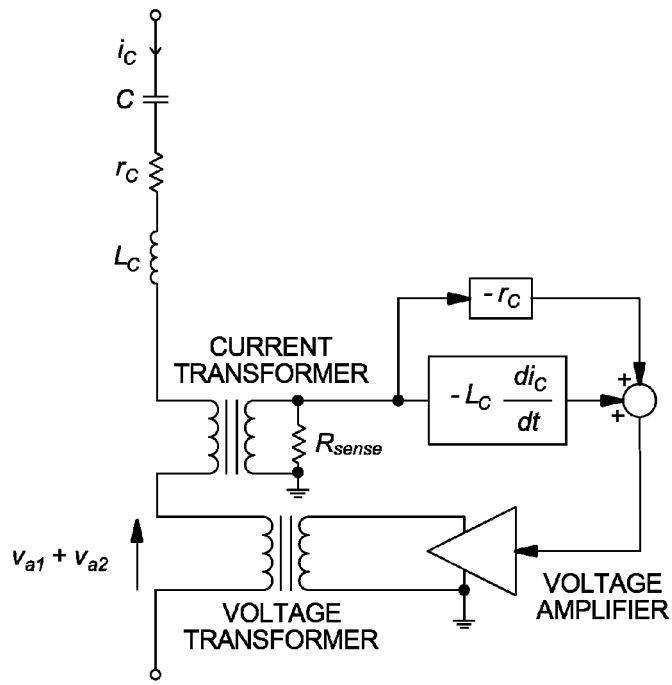
FIG. 13 is a circuit diagram showing the embodiment of FIG. 9 with an isolated sensing input and voltage output.

Based on the embodiment of FIGS. 9 and 10, some other forms of the isolated and non-isolated embodiments of the means for compensating the series inductance and resistance of a capacitive element, component, circuit or system can be derived and are shown in FIGS. 11 to 13.

FIG. 11 shows the embodiment of FIG. 9 with an isolated output. The capacitor current is sensed by a sensing resistor and the output of the voltage amplifier will generate a voltage $v_{a1} + v_{a2}$ at the output of the apparatus through a voltage transformer. The voltage ratio between the input of the voltage amplifier and the output of the apparatus is ideally equal to unity.

FIG. 12 shows the embodiment of FIG. 9 with an isolated input. The capacitor current is sensed through a current transformer and a sensing resistor and the output is a non-isolated type with the voltage follower directly connected to the output of the apparatus.

FIG. 13 shows the embodiment of FIG. 9 with an isolated input and an isolated output.

EXPERIMENTAL RESULTS

A prototype system according to the embodiment of FIG. 9 was constructed and tested and the following describes the results of experimentation using said prototype.

Figure 14A:
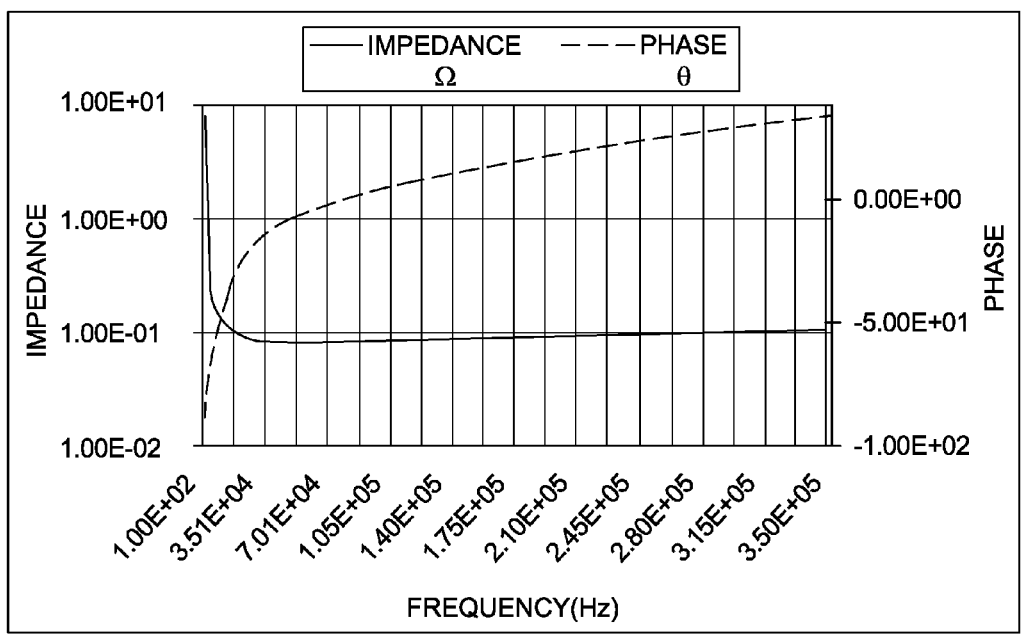
FIG. 14a is a graph of impedance against operating frequency for a practical capacitor.
Figure 14B:
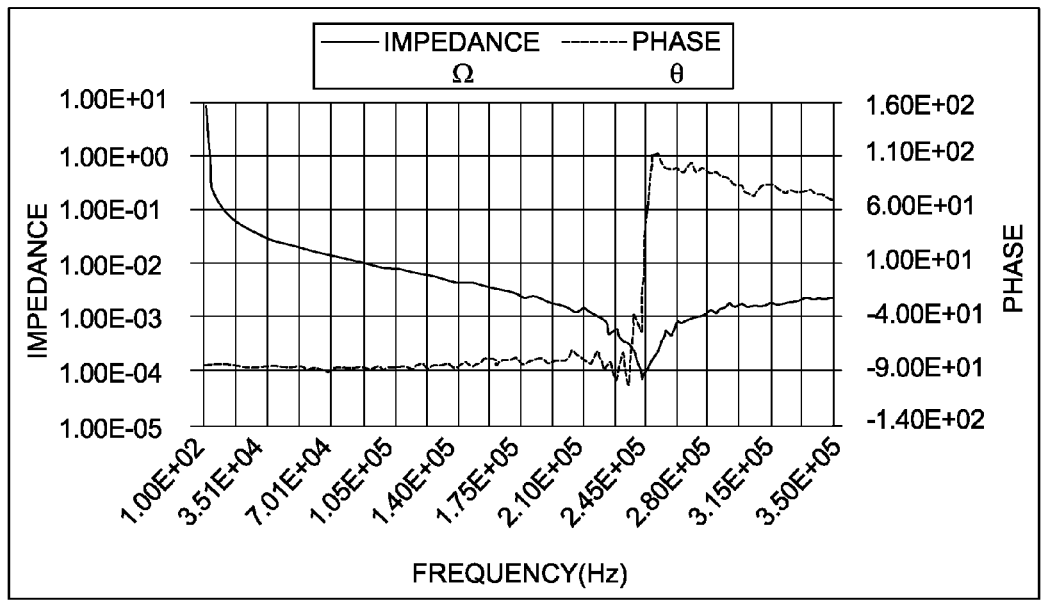
FIG. 14b is a graph of impedance against operating frequency for a practical capacitor with the active cancellation technique of the invention.

FIG. 14a shows the impedance characteristics of an electrolytic capacitor not subject to the suppression technique of the invention. The measured values are as follows: C=184 µF, $L_C$=20.27 nH, and $r_c$=0.1Ω. The resonant frequency is about 82 kHz. With the active cancellation technique of the invention, FIG. 14b shows the impedance characteristics achieved. The measured effective values of $L_C$ and $r_C$ are 2.2 nH and 0.09 mΩ, respectively giving a significant reduction in the series equivalent inductance and resistance. The resonant frequency is at 250 kHz.

Figure 5:
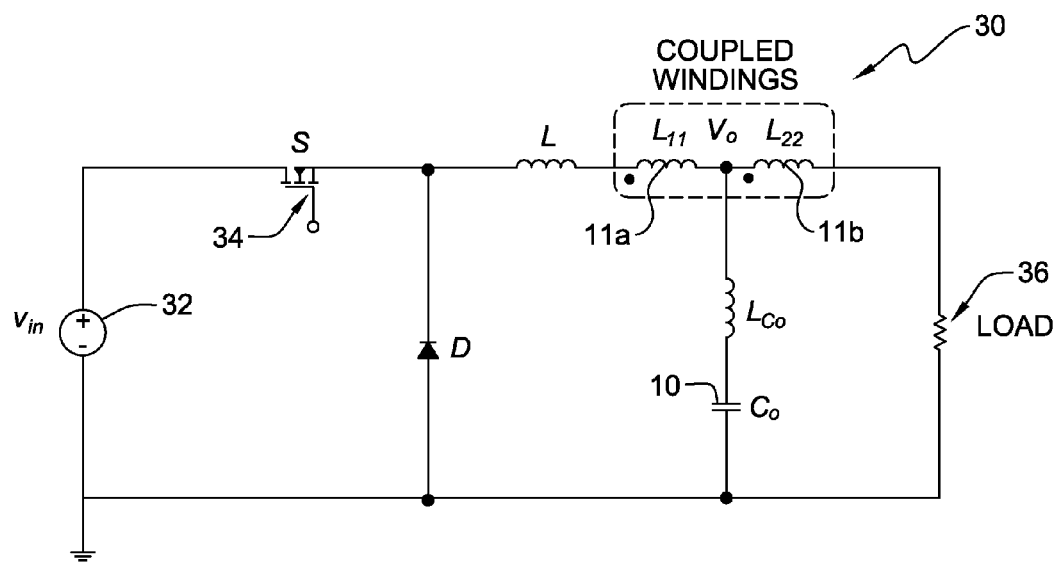
FIG. 5 is a circuit diagram showing how the ESL is canceled with coupled magnetic windings.
Figure 15A:
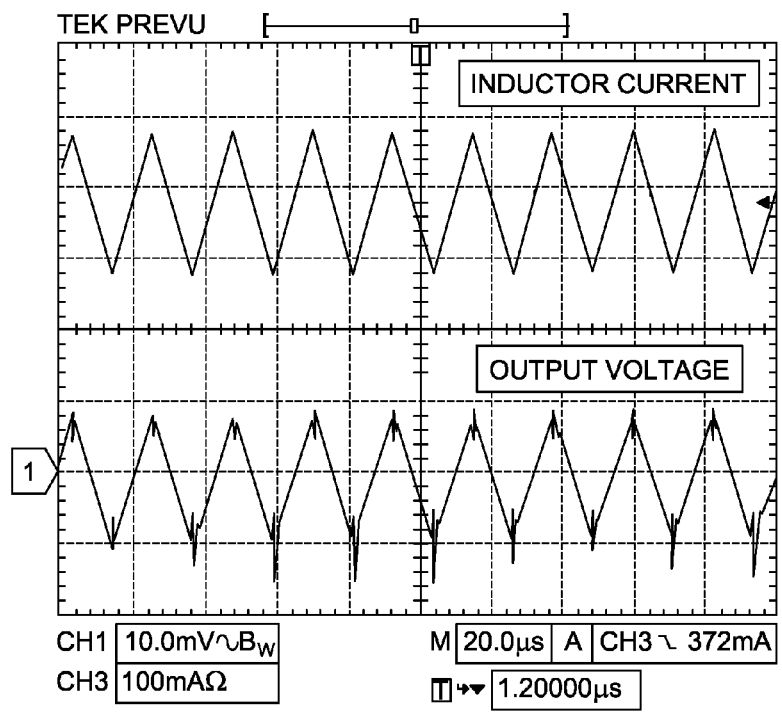
FIG. 15a is a graph of the ac component of the steady-state inductor current and output voltage waveforms of a buck converter without the active cancellation technique of the invention.
Figure 15B:
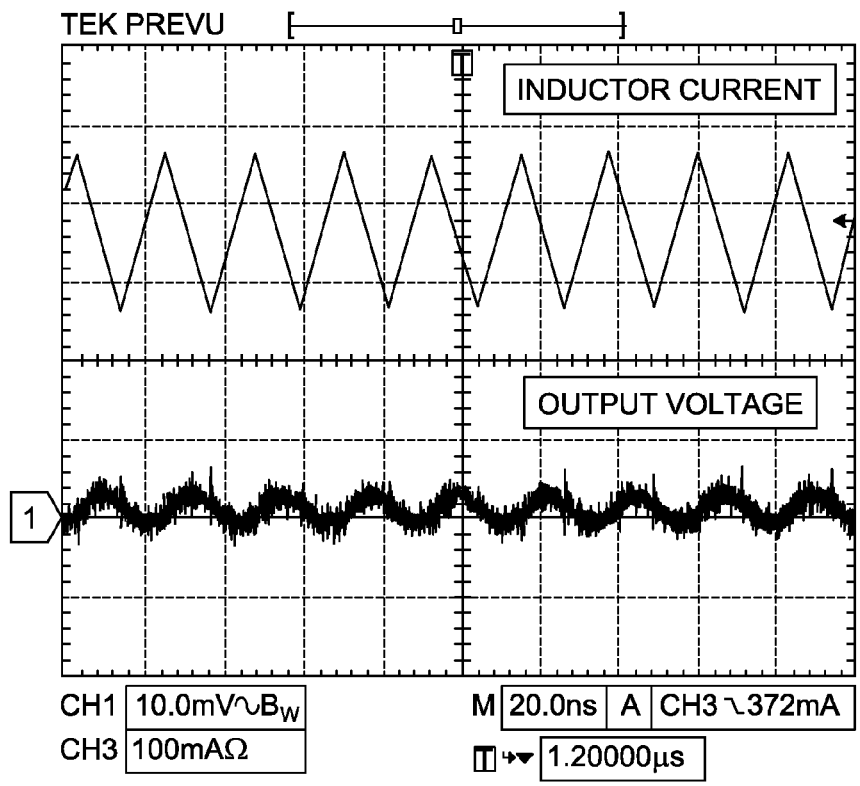
FIG. 15b is a graph of the ac component of the steady-state inductor current and output voltage waveforms of the buck converter with the active cancellation technique of the invention.

Note that the electrolytic capacitor system of the invention is connected to the output of a prior art buck converter as shown in FIG. 5. The output voltage of the buck converter is 5V and the load resistance is 10Ω. FIGS. 15a and 15b show the steady-state ac component of the inductor current and output voltage waveforms without and with, respectively, the active suppression technique of the invention. Without the active cancellation technique, the peak-to-peak output voltage ripple is 20 mV. With the active cancellation technique, the peak-to-peak output voltage ripple is about 7 mV. This is the result of reducing the series equivalent inductance and resistance.

Figure 16A:
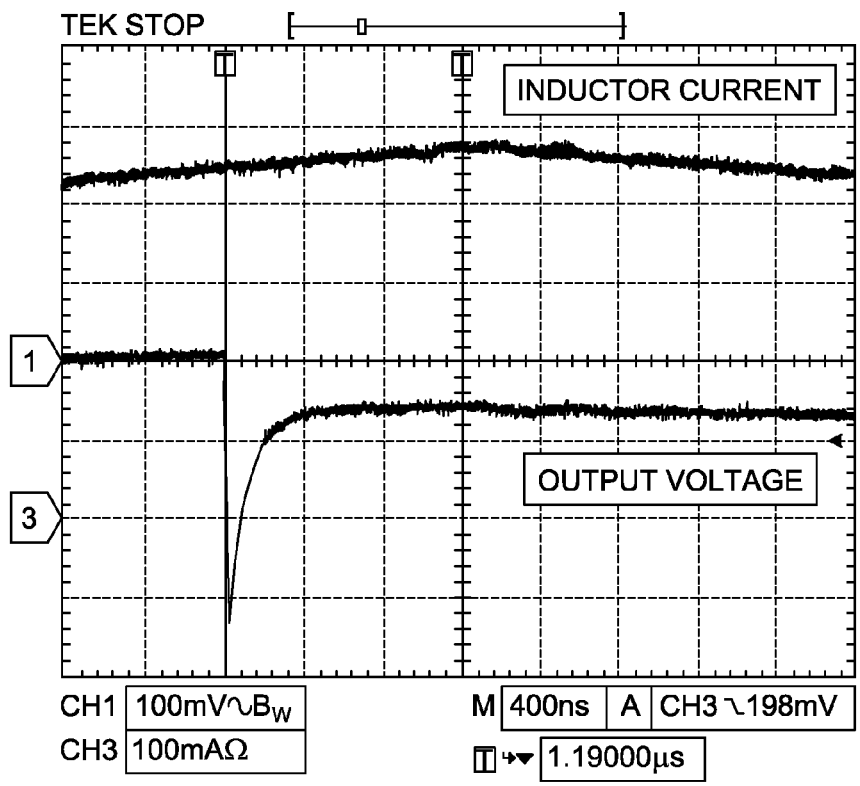
FIG. 16a is a graph of the ac component of the transient inductor current and output voltage waveforms of the buck converter without the active cancellation technique of the invention.
Figure 16B:
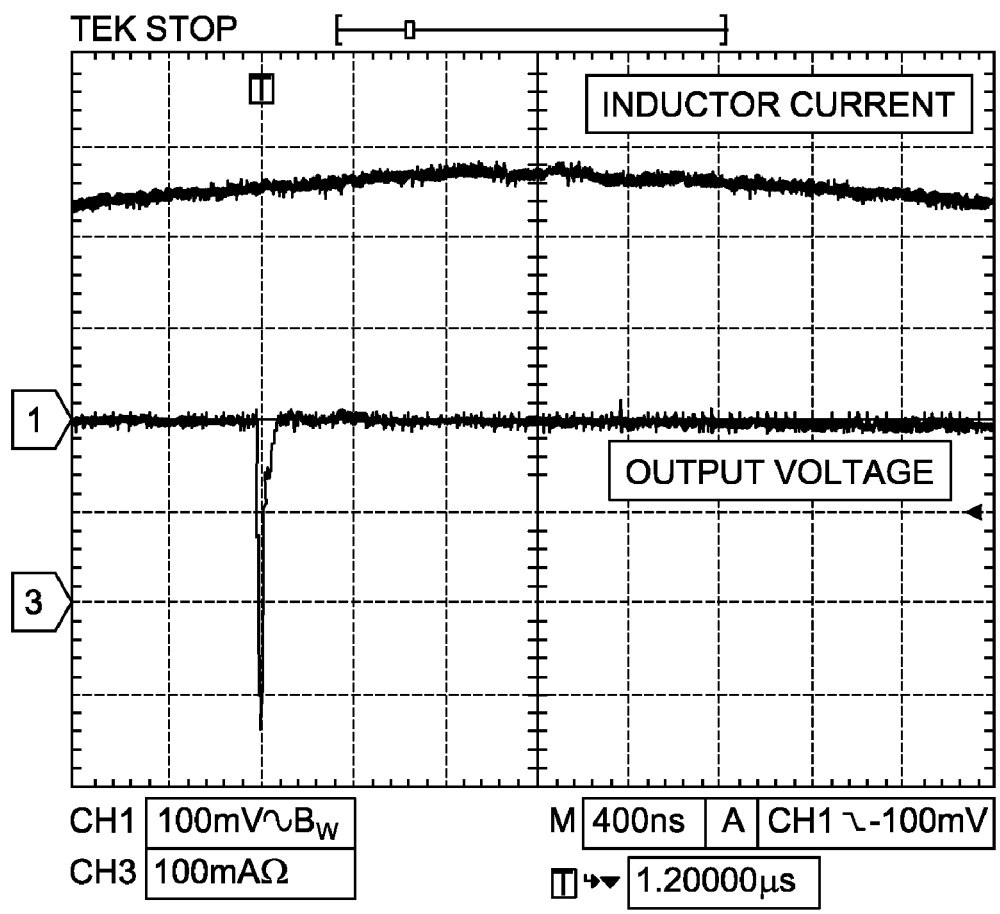
FIG. 16b is a graph of the ac component of the transient inductor current and output voltage waveforms of the buck converter with the active cancellation technique of the invention.

FIGS. 16a and 16b show the inductor current and output voltage waveforms without and with, respectively the active cancellation technique, when there is a sudden change in the load from 10Ω into 3.5Ω. Without the active cancellation technique, due to the presence of large series equivalent inductance, the settling time is 400 ns. Due to the presence of the series equivalent resistance, there is a steady-state error of 60 mV. With the active cancellation technique, as the series equivalent inductance is significantly reduced, the settling time is about 80 ns. Moreover, as the series equivalent resistance is also reduced, there is almost zero steady-state error.

While the invention is mainly illustrated and explained in conjunction with a capacitive element, it is understood that the invention is applicable to a wide variety of applications, including input and output filters of electrical networks, printed circuit board, transient suppressors, in which it is desirable to cancel the series inductance and resistance of a component or circuit or even a system. It is understood that the series inductance is not limited to a particular component because parasitic inductance of other parts of the circuit or system formed by wiring, printed-circuit board layout may also be addressed with the invention.

In summary, provided is a method for reducing or suppressing series parasitic inductance and/or resistive effects that affect the frequency response of components, elements and/or circuits in an electronic circuit or system that exhibit capacitance. Noise generated by series parasitic inductance and/or parasitic resistance of the components, the physical orientation of the components, and/or the layout of components, devices and/or conductive tracks (board traces) on printed circuit boards within an electronic circuit or system is reduced. This is achieved by adding a voltage source in series with a part or component of the electronic circuit or system that exhibits capacitance, wherein said current source is arranged to deliver a compensating voltage of generally equal magnitude but generally opposite phase to parasitic voltage associated with said part or component.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A method of reducing a parasitic effect in an electronic circuit or system, comprising:
   identifying a part of the electronic circuit or system that exhibits capacitance;
   determining a value of a series parasitic effect associated with said part of the electronic circuit or system that exhibits capacitance;
   sensing a voltage signal across said part of the electronic circuit or system;
   determining from said sensed voltage signal and said value of the series parasitic effect, a parasitic voltage associated with said part of the electronic circuit or system; and
   adding a voltage source in series with said part of the electronic circuit or system;
   wherein said voltage source is arranged to deliver a compensating voltage of roughly equal magnitude and roughly in opposite phase to said determined parasitic voltage.

2. The method of claim 1, wherein the added voltage source comprises an active voltage source.

3. The method of claim 1, wherein the added voltage source comprises at least one of a passive circuit, a linear-type voltage source, and a switched-mode voltage source.

4. The method of claim 1, wherein the series parasitic effect comprises a series inductive effect, and wherein said determining a parasitic voltage and said adding a voltage source comprise using a differentiator circuit to differentiate the sensed voltage signal and using a voltage driver circuit to generate the compensating voltage.

5. The method of claim 1, wherein the series parasitic effect comprises a series resistive effect, and wherein said determining a parasitic voltage and said adding a voltage source comprise using a multiplier circuit to determine the compensating voltage from the sensed voltage signal and using a voltage driver circuit to generate the compensating voltage.

6. The method of claim 1, wherein the series parasitic effect comprises both a series inductive effect and a series resistive effect, and wherein said determining a parasitic voltage and said adding a voltage source comprise using a differentiator circuit to differentiate the sensed voltage signal to determine a first compensating voltage for the series inductive effect, using a multiplier circuit to determine a second compensating voltage from the sensed voltage signal for the series resistive effect and using a single voltage driver circuit to generate a combined compensating voltage comprising said first and second compensating voltages.

7. The method of claim 1, wherein said part of the electronic circuit or system comprises at least one of an electronic system, a printed circuit board 'PCB', and a component or element on a PCB.

8. The method of claim 7, wherein said component or element on a PCB comprises at least one of an inductor, a diode, a transistor, and closely spaced wires or board traces.

9. An electronic circuit or system, comprising:
   means for determining a value of a series parasitic effect associated with a part of the electronic circuit or system that exhibits capacitance;
   means for sensing a voltage signal across said part of the electronic circuit or system;
   means for determining from said sensed voltage signal and said value of the series parasitic effect, a parasitic voltage associated with said part of the electronic circuit or system; and
   a voltage source in series with said part of the electronic circuit or system;
   wherein said voltage source is arranged to deliver a compensating voltage of roughly equal magnitude and roughly in opposite phase to said determined parasitic voltage.

10. The electronic circuit of claim 9, wherein the added voltage source comprises an active voltage source.

11. The electronic circuit of claim 9, wherein the added voltage source comprises at least one of a passive circuit, a linear-type voltage source, and a switched-mode voltage source.

12. The electronic circuit of claim 9, wherein the series parasitic effect comprises a series inductive effect, wherein the means for determining the parasitic voltage comprises a differentiator circuit to differentiate the sensed voltage signal, and wherein the voltage source a voltage driver circuit to generate the compensating voltage.

13. The electronic circuit of claim 9, wherein the series parasitic effect comprises a series resistive effect, wherein the means for determining the parasitic voltage comprises a multiplier circuit to determine the compensating voltage from the sensed voltage signal, and wherein the voltage source comprises a voltage driver circuit to generate the compensating voltage.

14. The electronic circuit of claim 9, wherein the series parasitic effect comprises both a series inductive effect and a series resistive effect, wherein the means for determining the parasitic voltage comprises a differentiator circuit to differentiate the sensed voltage signal to determine a first compensating voltage for the series inductive effect and a multiplier circuit to determine a second compensating voltage from the sensed voltage signal for the series resistive effect, and wherein the voltage source comprises a single voltage driver circuit to generate a combined compensating voltage comprising said first and second compensating voltages.

15. The electronic circuit of claim 9, wherein said part of the electronic circuit or system comprises at least one of an electronic system, a printed circuit board 'PCB', and a component or element on said PCB.

16. The method of claim 15, wherein said component or element on a PCB comprises at least one of an inductor, a diode, a transistor, and closely spaced wires or board traces.

17. The electronic circuit or system of claim 9, wherein the means for sensing comprises a voltage sensor.

18. A method of reducing a parasitic effect in an electronic circuit, comprising:
   determining a value of a parallel parasitic effect associated with a capacitor in the electronic circuit;
   sensing a voltage signal across said capacitor;
   determining from said sensed voltage signal and said value of the parallel parasitic effect, a parasitic voltage associated with said capacitor; and
   adding a voltage source in series with said capacitor;
   wherein said voltage source is arranged to deliver a compensating voltage of roughly equal magnitude and roughly in opposite phase to said determined parasitic voltage.

19. An electronic circuit comprising:
   a capacitor;
   means for sensing a voltage signal across said capacitor;
   means for determining from said sensed voltage signal and a value of a series parasitic effect associated with said capacitor, a parasitic voltage associated with said capacitor; and
   a voltage source in series with said capacitor;
   wherein said voltage source is arranged to deliver a compensating voltage of roughly equal magnitude and roughly in opposite phase to said determined parasitic voltage.

* * * * *